United States Patent [19]

Lampe et al.

[11] Patent Number: 4,892,907

[45] Date of Patent: Jan. 9, 1990

[54] FAST ROOM TEMPERATURE VULCANIZING SILICONE ELASTOMERS

[75] Inventors: Warren R. Lampe, Charlton; Frank J. Traver, Troy, both of N.Y.

[73] Assignee: General Electric Company, Waterford, N.Y.

[21] Appl. No.: 282,228

[22] Filed: Dec. 8, 1988

[51] Int. Cl.$^4$ ................................................. C08K 5/24
[52] U.S. Cl. ..................... 524/731; 524/860; 524/863; 528/18; 528/901; 528/33; 528/34
[58] Field of Search ............ 528/18, 901, 33, 34; 524/860, 863, 731

[56] References Cited

U.S. PATENT DOCUMENTS

| | | | |
|---|---|---|---|
| 3,133,891 | 5/1964 | Ceyzeriat | 260/18 |
| 4,508,888 | 4/1985 | Letoffe' et al. | 528/23 |
| 4,532,315 | 7/1985 | Letoffe' et al. | 528/14 |
| 4,624,900 | 11/1986 | Fau | 528/18 |
| 4,704,422 | 11/1987 | Bakken | 528/18 |
| 4,752,633 | 6/1988 | Aasen et al. | 524/731 |

FOREIGN PATENT DOCUMENTS 1308985 3/1973 United Kingdom .

*Primary Examiner*—Melvyn I. Marquis

[57] ABSTRACT

Room temperature vulcanizing elastomers are provided which comprise 100 parts of an $\alpha,\omega$-bis(hydroxy)dimethylpolysiloxane polymer, 2 to 20 parts of methyl triacetoxysilane and an amount of a hardening accelerator comprising a water-in-oil emulsion of water in a liquid organosilicon polymer stabilized with an organosilicon surfactant such that the water comprises at least 0.01% by weight of the total mixture.

14 Claims, No Drawings

FAST ROOM TEMPERATURE VULCANIZING SILICONE ELASTOMERS

BACKGROUND OF THE INVENTION

1. Field of the Invention

The present invention relates to curable compositions comprising hydroxyl-endblocked organopolysiloxanes and compounds having acyloxy radicals bonded to silicon atoms, and further including hardening accelerators which comprise an emulsion of water in a liquid organosilicon material stabilized with an organosilicon surfactant, as more particularly set out beyond.

In contrast to the known one-component compositions comprising acyloxy radicals bonded to silicon atoms described in U.S. Pat. No. 3,133,891, the compositions of the present invention are not stable upon storage because the time required for the cross-linking, or open time, is much shorter, for example on the order of less than one hour. Therefore, they must be prepared directly before use.

The compositions of the invention are particularly useful in applications which require a fast cross-linking time independent of the degree of humidity of the surrounding atmosphere, such as the production of an "in situ" seal in the automobile industry.

2. Description of the Prior Art

Organopolysiloxane compositions comprising acyloxy radicals bonded to silicon atoms, the cross-linking time of which is independent of the humidity of the ambient air, are known as taught in British Patent No. 1,308,985. This patent describes a curing process consisting of adding from 3 to 5% of a sodium silico-aluminate having from 5 to 10% by weight of absorbed water to the above compositions.

The process allows manufacture of silicone elastomer shaped articles by low pressure injection molding. However, British Patent No. 1,308,985 teaches that in order to attain relatively short hardening times, for example, on the order of 30 minutes, it is necessary to introduce a large amount of sodium silico-aluminate (15% in the table on page 2). This has the disadvantage of impairing the mechanical properties of the elastomers produced from the compositions. Furthermore, the patent does not mention means to obtain cross-linkinq times less than 30 minutes.

Another method is taught in U.S. Pat. Nos. 4,508,888 and 4,532,315. In these patents fast curing systems are prepared by mixing an alkali or alkaline earth metal phosphate ('888) or hydroxide ('315) which may contain water of hydration and possibly additional water, with the material to be cured. The curing agents are generally prepared by mixing the phosphate or hydroxide, and any additional water, with a non-functional dimethyl polysiloxane oil to form a paste. This paste is then mixed with the material to be cured. In the patents these products were then cured in 4 mm sections. The compositions were compared to similar compositions cured by ambient humidity, and also to materials cured with a physical mixture of water and the non-functional dimethyl polysiloxane oil. The compositions cured by ambient humidity required 24–36 hours to attain a degree of cure comparable to cures obtained with the accelerators of U.S. Pat. Nos. 4,508,888 and 4,532,315 in less than one hour. The composition mixed with water and silicone oil also cured significantly in the one hour time period shown in that reference.

It is difficult to mix incompatible liquids or pastes such as water or the compositions such as those of U.S. Pat. Nos. 4,508,888, and 4,532,315 with a highly viscous non-Newtonian and incompatible organosilicon mixture. Obtaining a good mixture is particularly difficult because the curable composition is quite viscous and reaction commences as soon as even traces of water come into contact with the curable mixture. The resulting hardening tends to make effective dispersion of more water into the mixture very difficult. This problem is aggravated by the fact that the volume of water required to initiate cure is very small when compared to the volume of curable composition. Consequently, it is quite difficult both to meter the appropriate amount of water into the mixture and to thoroughly mix it. Droplets of imperfectly dispersed water tend to become encapsulated in the cured composition, thus making it unavailable to initiate additional curing for a period of time, and creating flaws in the finished article.

Thus, a need exists in this art for hydroxyl-endblocked organopolysiloxane compositions comprising acyloxy radicals bonded to silicon atoms, which will rapidly harden at ambient temperature, regardless of ambient air humidity, particularly in a restricted or confined space, and provide elastomers having good mechanical properties.

This combination of properties would make it possible, among other things, to employ such compositions for the gluing or sealing of components;
(1) moving on industrial assembly lines, or
(2) for which no storage areas are available to ensure complete hardening.

SUMMARY OF THE INVENTION

A major object of the present invention is the provision of an improved hydroxyl-endblocked organopolysiloxane composition comprising acyloxy radicals bonded to silicon atoms, which has all of the aforementioned required properties.

Briefly, the improved organopolysiloxane compositions comprise a polyhydroxylated polysiloxane, a polyacyloxysilane and, as a hardening accelerator, an emulsion of water in a liquid organosilicon material stabilized with an organosilicon surfactant, as more particularly set out beyond.

DETAILED DESCRIPTION OF THE INVENTION

According to the present invention, organopolysiloxane compositions which cross-link to elastomers at ambient temperature, are advantageously comprised of:

(A) 100 parts by weight of polymers which are essentially α,ω-bis(hydroxy)diorganopolysiloxanes, having a viscosity of 500 to 10,000,000 cps at 25° C., each consisting of a sequence of recurring diorganosiloxy units of the formula $R_2SiO$ in which each individual R is chosen from the group consisting of monovalent hydrocarbon radicals having from 1 to 8 carbon atoms, optionally substituted by halogen atoms or cyano groups;

(B) 2 to 20 parts by weight of cross-linking agents of the general formula $R_pSi(OCOR^2)_{4-p}$ in which the symbol R has the meaning given under (A), the symbol $R^2$ denotes a hydrocarbon radical free from aliphatic unsaturation having from 1 to 15 carbon atoms, and the symbol p is zero or one;

(C) 0 to 300 parts by weight of inorganic fillers; and (D) A hardening accelerator, said accelerator comprising a water-in-oil emulsion of water in a liquid organosilicon polymer stabilized with an organosilicon surfactant, the amount of emulsion being such that the water comprises at least 0.01% by weight of (A)+(B).

The polymers (A) having a viscosity of 500 to 10,000,000 cps at 25° C., preferably 1,000 to 2,000,000 cps at 25° C., are essentially linear polymers, basically consisting of diorganosiloxy units of the formula $R_2SiO$, and blocked with a hydroxyl group at each end of the chain. Although not preferred, monoorganosiloxy units of the formula $RSiO_{1.5}$ and/or siloxy units of the formula $SiO_2$ may be present in amounts of at most 2% relative to the number of diorganosiloxy units.

The hydrocarbon radicals denoted by the symbols R, having from 1 to 8 carbon atoms, optionally substituted by halogen atoms or cyano groups are advantageously:

(i) alkyl and haloalkyl radicals having from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl or 4,4,4,3,3-pentafluorobutyl radicals, (ii) cycloalkyl and halocycloalkyl radicals having from 4 to 8 carbon atoms, such as cyclopentyl, cyclohexyl, methylcyclohexyl, 2,3-difluorocyclobutyl or 3,4-difluoro-5-methylcycloheptyl radicals, (iii) alkenyl radicals having from 2 to 4 carbon atoms, such as vinyl, allyl or 2-butenyl radicals, aryl and haloaryl radicals having from 6 to 8 carbon atoms, such as phenyl, tolyl, xylyl, chlorophenyl, dichlorophenyl or trichlorophenyl radicals, (iv) cyanoalkyl radicals, the alkyl moieties of which have from 2 to 3 carbon atoms, such as the β-cyanoethyl and γ-cyanopropyl radicals.

The following are exemplary of units denoted by the formula $R^2SiO$:

$(CH_3)_2SiO$
$CH_3(CH_2=CH)SiO$
$CH_3(C_6H_5)SiO$
$(C_6H_5)_2SiO$
$CF_3CH_2CH_2(CH_3)SiO$
$NC-CH_2CH_2(CH_3)SiO$
$NC-CH(CH_3)CH_2(CH_2=CH)SiO$
$NC-CH_2CH_2CH_2(C_6H_5)SiO$.

It should be understood it is within the scope of the invention to employ as polymers (A) α,ω-bis(hydroxy)-diorganopolysiloxane copolymers, or a mixture consisting of α,ω-bis(hydroxy)diorganopolysiloxane polymers which differ from each other in molecular weight and/or the nature of the groups bonded to the silicon atoms.

Such α,ω-bis(hydroxy)diorganopolysiloxane copolymers (A) are readily available commercially; moreover, they can be easily prepared. One of the most widely employed methods of preparation consists, in a first step, of polymerizinq diorganocyclopolysiloxanes with the aid of catalytic amounts of alkaline or acidic agents and then treating the polymerizates with calculated amounts of water; this addition of water, which is inversely proportional to the viscosity of the polymers to be prepared, can be wholly or partly replaced with low viscosity α,ω-bis(hydroxy)diorganopolysiloxane oils, for example, ranging from 5 to 200 cps at 25° C., having a high proportion of hydroxyl radicals, for example, from 3 to 14%.

The cross-linking agents (B) are used in amount of 2 to 20 parts by weight, preferably of 3 to 15 parts by weight, per 100 parts by weight of the α,ω-bis(hydroxy)-diorganopolysiloxane polymers (A).

The cross-linking agents conform to the formula:

$$R_pSi(OCOR^2)_{4-p}$$

in which, as mentioned above, the symbol R has the meaning given under (A), the symbol $R^2$ denotes a hydrocarbon radical having from 1 to 15 carbon atoms free from aliphatic unsaturation, and the symbol p is zero or 1, where $R^2$ denotes a radical selected from among:

(1) alkyl radicals having from 1 to 15 carbon atoms, such as methyl, ethyl, n-propyl, n-butyl, n-pentyl, 1-ethylpentyl, n-hexyl, 2-ethylhexyl, n-octyl, n-odecyl, nodecyl, n-dodecyl or n-pentadecyl radicals;

(2) cycloalkyl radicals having from 5 to 6 ring carbon atoms, such as cyclopentyl and cyclohexyl radicals;

(3) aryl radicals having from 6 to 8 carbon atoms such as phenyl, tolyl or xylyl radicals.

Representative examples of cross-linking agents (B) are those corresponding to the following formulae:

$CH_3Si(OCOCH_3)_3$
$C_2H_5Si(OCOCH_3)_3$
$CH_2=CHSi(OCOCH_3)_3$
$C_6H_5Si(OCOCH_3)_3$
$CH_3Si[OCOCH(C_2H_5)(CH_2)_3-CH_3]_3$
$CF_3CH_2CH_2Si(OCOC_6H_5)_3$
$CH_3Si(OCOC_6H_5)_3$.

The preferred cross-linking agents are those in which R is lower alkyl such as methyl and ethyl and the acyl group is acetoxy. Most preferred is methyl triacetoxysilane.

It should be understood that shortly after mixing the components (A) and (B) a reaction occurs in which the hydroxyl group of (A) reacts with one of the acyl groups of (B), to form an acyloxy-endstopped product. Thus the components (A) and (B) may be replaced with the devolatilized products prepared by the stoichiometric reaction of (A) and (B)prior to formulation.

If a cross-linking agent (B) with low molecular weight acyloxy radicals is employed, for example methyltriacetoxysilane, an organic acid of low molecular weight is formed during the cross-linking which is generally volatile at the typical cross-linking temperatures and which is removed from the elastomer by evaporation. On the other hand, if use is made of a cross-linking agent (B) whose acyloxy radicals have a higher molecular weight, for example, methyltris(2-ethylhexanoyloxy)silane, 2-ethylhexanoic acid is formed, which is only slightly volatile at the typical cross-linking temperatures and therefore remains in the elastomer.

With these cross-linking agents (B) there may be associated silanes, each of which has only two hydrolyzable groups; these silanes correspond to the formula:

$$R^3{}_2Si(OCOR^2)_2$$

in which the symbols $R^2$ have the meaning of the symbol $R^2$ in the formula $R_pSi(OCOR^2)_{4-p}$ and the symbol $R^3$ has the meaning of the symbol R in this same formula, or a tertiary butoxy radical of the formula $(CH_3)CO-$.

The following examples are representative of these silanes formulae:

$(CH_3)_2Si(OCOCH_3)_2$
$CH_2=CH(CH_3)Si(OCOCH_3)_2$
$(C_6H_5)_2Si(OCOCH_3)_2$
$[(CH_3)_3CO]_2Si(OCOCH_3)_2$
$(CH_3)_2Si[OCOCH(C_2H_5)(CH_2)_3CH_3]_2$
$[(CH_3)_3CO]_2Si[OCOCH(C_2H_5)(CH_2)_3CH_3]_2$.

The molar quantity employed of the silanes of the formula $R^3Si(OCOR^2)_2$ relative to the quantity employed of the cross-linking silanes (B) of the formula $R_pSi(OCOR^2)_{4-p}$ is not critical, but it is necessary that the upper limit be such that the mixture of both types of silanes always contains on average at least 2.5-$OCOR^2$ groups per silicon atom.

Thus, when taking, for example, 1 mol of cross-linking silane (B) of the formula $RSi(OCOR^2)_3$ (with p=1), there must be associated With it at most 1 mol of the silane $R^3Si(OCOR^2)_2$; similarly, when taking 1 mol of the cross-linking silane (B) of the formula $Si(OCOR^2)_4$ (with p=0), there must be associated with it at most 3 mol of silane $R^3Si(OCOR^2)_2$.

The main function of the silanes of the formula $R^3{}_2Si(OCOR^2)_2$ is to link the chains of the α,ω-bis(hydroxy)diorganopolysiloxane polymers (A), which makes it possible to obtain elastomers having good physical characteristics starting from compositions containing polymers (A) whose viscosity is relatively low, for example, ranging from 700 to 5,000 cps at 25° C.

The inorganic fillers (C) are employed in an amount of 0 to 300 parts by weight, preferably 5 to 150 parts by weight, per 100 parts by weight of α,ω-bis(hydroxy)diorganopolysiloxane polymers (A). These fillers can be in the form of very finely divided particles whose mean particle diameter is less than 0.1 um. Representative of such fillers are pyrogenic silicas and precipitated silicas; their specific surface is generally greater than 40m²/g, and is most frequently in the range 150–400 m²/g.

These fillers can also be in the form of more coarsely divided particles, with a mean particle diameter greater than 0.1 um. Representative of such fillers are ground quartz, alpha-cristobalite, diatomaceous silicas, calcium carbonate, calcined clay, titanium oxide, the oxides of iron, zinc, chromium, zirconium or magnesium, the various forms of alumina (hydrated or not), boron nitride, lithopone or barium metaborate; their specific surface is generally below 30 m²/g.

The fillers (C) may have been surface-modified by treatment with the various organosilicon compounds conventionally employed for this application. Thus, the fillers may have been treated with organosilicon compounds such as organochlorosilanes, dioganocyclopolysiloxanes, hexaorganodisiloxanes, hexaorganodisilazanes or diorganocyclopolysilazanes. In the majority of cases, the modified fillers contain from 3 to 30% of their weight of organosilicon compounds.

The fillers (C) may consist of a mixture of several types of fillers with different particle size distributions; thus, for example, they may consist of a mixture of 5 to 40% of finely divided silicas having a specific surface greater than 40 m²/g with 95 to 60% of more coarsely divided silicas having a specific surface below 30 m²/g.

The water-in-oil emulsions comprising the cure accelerators (D) of the invention are prepared by emulsifying from about 1 to about 100 parts or more by weight of water as a discontinuous phase in a continuous oil matrix comprising 100 parts of a polysiloxane fluid to which from about 0.1 to about 10 parts of an organosilicon surface active agent has been added. The order of addition of the components is not critical. The emulsification is readily accomplished by use of conventional mixing techniques such as a bench-top jar mill or a Willems Polytron.

The curable organopolysiloxane compositions of the invention ultimately may cure by mere exposure to ambient atmospheric moisture for a sufficient period of time. Therefore the amount and composition of water-in-oil emulsion chosen used as cure accelerator (D) may be varied greatly, particularly depending on the thickness of the composition to be cured, the cure rate which is desired, and the like. Consideration must be given to parameters such as the stoichiometry of the curing reaction, possible plasticization of the cured composition if the silicone fluid is non-functional, ease of metering and mixing the cure accelerator into the curable composition, and the like, in preparing formulations of the invention.

The stoichiometric amount of water and ultimately the quantity required for cure will depend on the amount and functionality of the polyacyloxysilane(s) employed in the curable composition. When relying entirely on the cure accelerators of the invention to effect a cure, it is desirable to use at least about a 50 percent molar excess of the stoichiometric amount of water as water-in-oil emulsion. Smaller amounts of the cure accelerators may be used for slower rates of cure. As the amount used approaches the stoichiometric amount, the rate and extent of cure becomes more and more dependent on the presence of atmospheric moisture. In some cases, the acceptable rate of cure is sufficiently slow that use of less than a stoichiometric amount of added water as water-in-oil emulsion will give satisfactory results. Therefore, as a practical matter, the amount of water added as the water-in-oil emulsion as the curing accelerator (D) is not narrowly critical, and may range from as little as 0.01 part of water per 100 parts of α,ω-bis-(hydroxy) diorganopolysiloxane to as much as 7 parts per 100 parts. Use of large excesses of water will not accelerate cure significantly and may cause deleterious effects.

The concentration of water in the water-in-oil emulsion used as the cure accelerator (D) likewise may range over broad limits. When the fluid organosilicon polymer which forms the oil phase of the emulsion is non-functional, it does not cure, and may plasticize or soften the cured composition of the invention. In such cases the use of an emulsion which has a very low water content may be undesirable. If a very high concentration of water is used, the quantity of emulsion required to achieve the desired rate of cure may be so small it becomes difficult to meter in the desired amount of accelerator and/or disperse it completely in the curable mixture. The concentration is not critical and may be from as low as 1 part of water or less per 100 parts of fluid non-functional silicone polymer to as much as 100 parts or more of water per 100 parts of fluid. For ease of metering and mixing, it may be desirable to utilize a concentration of water which will result in the volume of cure accelerator (D) containing the desired amount of water to be at least about five percent of the volume of the curable composition.

The amount of the organosilicon surfactant used to stabilize the water-in-oil emulsion used as the cure accelerator (D) likewise may range over broad limits. If too little surfactant is used, the emulsion may not be stable, particularly on extended storage. Once the amount sufficient to form a stable emulsion is employed, additional amounts are not necessary. The amount of surfactant used may be from about 0.1 percent to about 10 percent or more of the amount of water to be emulsified in the fluid silicone polymer.

Therefore some experimentation may be required to formulate a composition of cure accelerator (D) for curing particular curable compositions for particular applications under particular ambient conditions. The parameters given above are sufficient for one skilled in the art to readily determine the formulation required.

The polysiloxane fluids used to form the cure accelerators (D) of the invention may be $\alpha,\omega$-bis(hydroxy)-diorganopolysiloxane polymers similar or identical to component (A), $\alpha$-(hydroxy-$\omega$-(triorganosiloxy) diorganopolysiloxane polymers, $\alpha,\omega$-bis(triorganosiloxy) diorganopolysiloxane polymers, or mixtures thereof, having a viscosity of at least 500 cps at 25° C., consisting essentially of diorganosiloxy units and, at most about 1% monoorganosiloxy units, the organic radicals bonded to the silicon atoms comprising methyl, vinyl or phenyl radicals, at least 60% of these radicals being methyl radicals, and at most 10% being vinyl radicals. The maximum viscosity of these polymers is not critical, but it is most convenient their viscosity range from 500 to about 100,000 cps. These polymers are commercially available or they may be prepared by conventional techniques. These polymers serve to introduce water into the curable composition and may also act as plasticizers for the cured compositions. The preferred polymers are $\alpha,\omega$-bis(trimethylsiloxy)-diorganosiloxane polymers.

The preferred surface active agents used to prepare the water-in-oil emulsions used as the cure accelerators (D) of the invention are the polysiloxanes described in copending application Ser. No.087,051, assigned to the same assignee as the present application, filed Aug. 19, 1987 which comprise (a) units of the formula:

$$R^4{}_2SiO_{2/2} \tag{a}$$

where each $R^4$ individually is a substituted or unsubstituted hydrocarbon radical of from 1 to about 12 carbon atoms, (b) units of the formula $$R^4R^5SiO_{2/2} \tag{b}$$

where $R^5$ is a polyalkylene ether residue of the formula:

$$-R^7-(OR^6)-{}_nOR^8$$

where each $R^6$ individually is substituted or unsubstituted alkylene of 2 to 6 carbon atoms, $R^7$ is a substituted or unsubstituted alkylene group of from 2 to 20 carbon atoms, $R^8$ is the same as $R^4$ or is a lower acyl group or hydrogen, and n has the value of from about 5 to about 20, and (c) endstopping units of the formula $R^4{}_3SiO_{1/2}$ with the proviso that the polysiloxane absent $R^5$ has a molecular weight of from about 10,000 to about 40,000 and the weight ratio of $R^5$ to polysiloxane absent $R^5$ is from greater than 15/85 to less than 35/65.

In addition to the (a), (b) and (c) units described above, the polysiloxane surface active agent may also include (d) minor amounts of units of the formula $$R^4SiO_{3/2} \tag{d}$$

The use of the units (d) is not preferred and where used, they should constitute from about 0.1 to about 1% by number of siloxane units.

Suitable $R^4$ Groups include, methyl, ethyl, vinyl, phenyl, trifluoropropyl, etc. Preferably, at least about 80% by number of all $R^4$ groups attached to silicon are methyl.

$R^6$ may be $-CH_2CH_2-$, $-CH_2CH(CH_3)-$, $-CH_2C(CH_3)_2-$, $-CH_2CH_2CH_2CH_2-$, etc. However, it is preferred to form emulsions herein that at least 50% by number of $R^6$ be $-CH_2CH_2-$. Most preferably, all of the $R^6$ units are $-CH_2CH_2-$.

It is critical herein that the number of repeating units of $R^5$, i.e. the value of n, be between about 5 and 20. Thus, in the case of ethylene oxide as the repeating unit, the molecular weight of $R^5$ should be less than about 900. The preferred value of n is from 10 to 15, which likewise for ethylene oxide provides a molecular weight for $R^5$ of no more than about 700.

$R^7$ is the group which bonds the polyoxyalkylene segment to the polysiloxane. Preferably, this group is derived from unsaturated carboxylic acids or alcohols. Thus, $R^7$ may be $-CH_2CH_2CH_2-$, $-CH_2CH_2-$, $-CH_2CH_2CH_2CH_2-$, $-(CH_2)_{10}(C=0)-$ etc. Preferably, $R^7$ is $-CH_2CH_2CH_2-$.

$R^8$ is the terminal group of the polyalkylene ether. The type of $R^8$ is not critical and may be selected from hydrogen, methyl, ethyl, propyl, butyl, phenyl, alkenyl, acetyl, etc. preferably, $R^8$ is hydrogen.

The polysiloxane absent $R^5$ should have a molecular weight between about 10,000 and 40,000 and preferably between 25,000 and 35,000. Further, the weight ratio of $R^5$ to polysiloxane absent $R^5$ should range from greater than 15/85 to less than 35/65 on a weight basis. Preferably, this ratio is between about 20/80 to 30/70. Given this ratio and a value for n above, it is possible to calculate the ratio of (b) siloxane units to all other siloxane units for any given surfactant. It is preferred herein that this ratio be greater than about 10/400 and preferably greater than about 15/400. The upper limit of this ratio is not as important and can be generally determined from ratios already given.

The polysiloxane surface active agent may be prepared by well known methods. The preferred method is to initiate the polymerization of an alkylene oxide with an unsaturated alcohol such as allyl alcohol to produce a terminally unsaturated polyalkylene oxide. The terminally unsaturated polyalkylene glycol is subsequently added to the silicon bonded hydrogens on suitable polysiloxane. The addition reaction proceeds best in the presence of an active metal catalyst such as platinum.

The manufacture of the polysiloxane surface active agents is well known and understood. Methods of preparation are taught in U.S. Pat. Nos. 4,265,878; Re.

25,727; 3,174,987; 4,122,029; 3,172,899, and hereby incorporated by reference.

The organopolysiloxane compositions according to the invention may contain, in addition to the constituents (A), (B), (C) and (D), hardening catalysts which are typically selected from among;

(i) metal salts of carboxylic acids, preferably organotin salts of carboxylic acids, such as dibutyltin diacetate and dilaurate, (ii) products of reaction of organotin salts of carboxylic acids with titanic acid esters (U.S. Pat. No. 3,409,753), (iii) organic derivatives of titanium and of zirconium, such as the titanic and zircronic acid esters.

These hardening catalysts are typically employed in a proportion from 0.0003 to 6 parts by weight, preferably from 0.0008 to 5 parts by weight, per 100 parts by weight of $\alpha,\omega$-bis(hydroxy)diorganopolysiloxane polymers (A).

The organopolysiloxane compositions may also contain the usual adjuvants and additives, including in particular, heat stabilizers. These latter materials, which, through their presence, improve the heat resistance of the silicone elastomers, may be selected from the salts, oxides and hydroxides of rare earths (and more especially from the ceric oxides and hydroxides) or from the oxides of titanium and of iron, preferably obtained by combustion.

Advantageously, the compositions according to the invention contain from 0.1 to 15 parts by weight, and preferably from 0.15 to 12 parts by weight, of heat stablilizers per 100 parts by weight of $\alpha,\omega$-bis(hydroxy)-diorganopolysiloxane polymers (A).

Compounds improving flame resistance are exemplary of other additives; these are preferably selected from among organic phosphorus derivatives, organic halogen compounds, and organic and inorganic platinum derivatives.

In addition to the main constituents (A), (B), (C) and (D) and the above-mentioned additives, other organopolysiloxane compounds may be introduced with the intention of modifying the physical characteristics of the compositions of the invention and/or the mechanical properties of the elastomers produced by the hardening of these compositions.

These organopolysiloxane compounds are well known; they include, more especially:

(1) $\alpha,\omega$-bis(triorganosiloxy)diorganopolysiloxane polymers and/or $\alpha$-(hydroxy)-$\omega$-(triorganosiloxy)-diorganopolysiloxane polymers in addition to any utilized in the cure accelerator (D) of the invention, having viscosities of at least 1,000 cps at 25° C., consisting essentially of diorganosiloxy units and at most 1% of monoorganosiloxy and/or siloxy units, the organic radicals bonded to the silicon atoms comprising methyl, vinyl and phenyl radicals, at least 60% of these organic radicals being methyl radicals and at most 10% being vinyl radicals. The viscosity of these polymers may reach tens of millions of cps at 25° C.; they therefore include low viscosity fluids to viscous oils and soft to hard gums. They are prepared according to conventional techniques. Preferably use is made of $\alpha$-(hydroxy)-$\omega$-(trimethylsiloxy)dimethylpolysiloxane oils having a viscosity ranging from 1,000 to 1,000,000 cps at 25° C. These polymers, which act as "curable" plasticizers, may be added to an amount of at most 150 parts by weight, preferably of 5 to 120 parts by weight, per 100 parts by weight of $\alpha,\omega$-bis(hydroxy)diorganopolysiloxane polymers (A).

(2) branched, liquid methylpolysiloxane polymers having from 1.4 to 1.9 methyl radicals per silicon atom, consisting of a combination of units of the formulae:

$(CH_3)_3SiO_{0.5}$
$(CH_3)_2SiO$ and
$CH_3SiO_{1.5}$ and containing from 0.1 to 8% of hydroxyl groups. These can be obtained by conventional hydrolysis of the corresponding chlorosilanes. Preferably branched polymers are used whose units are distributed according to the following ratios:

$(CH_3)_3SiO_{0.5}/(CH_3)_2SiO = 0.01$ to $0.15$ and $CH_3SiO_{1.5}/(CH_3)_2SiO = 0.1$ to $1.5$.

These polymers may be added in an amount of at most 70 parts by weight, preferably of 3 to 50 parts by weight, per 100 parts by weight of $\alpha,\omega$-bis(hydroxy)diorganopolysiloxane polymers (A). They impart a lower modulus to the system, particularly when used with modified silicas.

(3) diorganopolysiloxane oils blocked with hydroxyl groups and/or lower alkoxy groups having a low viscosity generally in the range 2 cps to 4,000 cps at 25° C. (if these oils are blocked only with hydroxyl groups, their viscosity is below 700 cps at 25° C.); the organic radicals bonded to the silicon atoms of these oils are, as before, selected from among methyl vinyl or phenyl radicals, at least 40% of these radicals being methyl radicals and at most 10% being vinyl radicals. As chain-blocking lower alkoxy groups, methoxy, ethoxy, isopropoxy, n-propoxy, n-butoxy, isobutoxy and tertiary butoxy groups are exemplary. The hydroxyl and/or alkoxy group contents generally range from 0.5 to 20%. These oils are prepared according to conventional methods. Preferably, $\alpha,\omega$-dihydroxydimethylpolysiloxane oils, having a viscosity of 200 to 600 cps at 25° C., or $\alpha,\omega$-dimethoxy(or diethoxy)-dimethylpolysiloxane oils, having a viscosity of 30 to 2,000 cps at 25° C. are used. They may be added in a proportion of at most 50 parts by weight, preferably of 2 to 40 parts by weight, per 100 parts by weight of $\alpha,\omega$-bis(hydroxy)diorganopolysiloxane polymers (A). These oils make it possible to reduce the overall viscosity and are conventionally called process aids.

(4) hydroxylated organosilicon compounds selected from among compounds corresponding to the general formula:

$Z'SiZ_2(OSiZ_2)_wOH$, which are solid at ambient temperature. In this formula, the symbols Z, which may be identical or different, denote methyl, ethyl, n-propyl, vinyl or phenyl radicals; the symbol Z' denotes a hydroxyl radical or Z, and the symbol w is zero, 1 or 2. As specific examples of these compounds, representative are: diphenylsilanediol, methylphenylsilanediol, dimethylphenylsilanol, 1,1,3,3-tetramethyldisiloxanediol, 1,3-dimethyl-1,3-diphenyldisiloxanediol or 1,1,5,5-tetramethyl-3,3-diphenyl-trisiloxanediol. They may be added in a proportion of at most 30 parts by weight, preferably 0.5 to 20 parts by weight, per 100 parts by weight of α,ω-bis(hydroxy)diorganopolysiloxane polymers (A). These materials give non-Newtonian flow characteristics to the composition, i.e. the composition is more resistant to sagging when applied to a vertical surface. The α,ω-bis(triorganosiloxy)diorganopolysiloxane and/or diorganopolysiloxane polymers described under (1) may be replaced wholly or partially, with organic compounds which are unreactive towards the constituents (A), (B), (C) and (D) and which are miscible at least with the α,ω-bis(hydroxy)diorganopolysiloxane polymers (A). Exemplary of such organic compounds, representative are the polyalkylbenzenes obtained by alkylation of benzene with longchain olefins, particularly olefins with 12 carbon atoms carbon atoms emanating from the polymerization of propylene.

The compositions according to the invention may, if appropriate, be used after dilution with liquid organic compounds or mixtures, the diluents preferably being conventional commercially available materials selected from among:

(i) optionally halogenated, aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene or orthodichlorobenzene;

(ii) aliphatic and cycloaliphatic ketones, such as methyl ethyl ketone, methyl isobutyl ketone, cyclohexanone or isophorone;

(iii) esters, such as ethyl acetate, butyl acetate or ethoxyethyl acetate.

The amount of diluent is generally of little significance generally being below 60%.

The preparation of the compositions according to the invention can take place in a single step, by mixing the combination of the components (A), (B), (C) and (D)and, if appropriate, the above-mentioned additives and adjuvants in a suitable reactor. The components (A), (B), (C), additives and adjuvants may be added to the reactor in any order but it is almost always, preferable to add the accelerators (D) after adding all of the other compounds to avoid premature hardening of the mixture.

The preparation of the compositions can also take place in 2 steps. According to this technique, which is the preferred form of the present invention, one-component compositions are first prepared by mixing, in the absence of moisture, the constituents (A), (B) and (C) and, if appropriate, the conventional additives and adjuvants. These curable compositions are stable on storage and harden only on exposure to moist air. Such compositions have been employed alone and their curing, hardening or cross-linking then develops from the surfaces in contact with the surrounding air and proceeds progressively towards the interior of the mixture. The time for complete cure is comparatively long and depends chiefly on the thickness of the deposited layers and on the humidity of the atmosphere surrounding the compositions. Generally, a period of 24 hours would thus be required at ambient temperature, with a humidity of 60%, to cross-link a 4 mm layer properly. In very thick sections, or where the surface area to total volume of material to be cured is very low, the penetration of moisture may be so slow that essentially no cure occurs in the deep interior for an extended period of time.

In a second step, the curing accelerators (D) are added to these one-component compositions, and mixed therewith, at the time of use. The resulting compositions must be used quickly, since hardening, in contrast to that of one-package RTV compositions, develops essentially uniformly throughout the mixture. The time for complete cure is variable, since it depends on the nature and on the quantities of the accelerators (D) employed. By varying these various parameters it is possible to obtain hardening times ranging from a few minutes to 60 minutes or longer. The temperature is also an important parameter, in fact, variations in the temperature level have a very marked effect on the rate of cure. If the temperature increases the cure time is shortened; in the reverse case, cure time is lengthened.

Thus, reductions in cure time of one half, and sometimes much more, may be obtained by exposing the compositions to temperatures ranging, for example, from 50° to 90° C. instead of maintaining them at ambient temperature, in the range of 15°–25° C.

Another object of the present invention is the use of the rapidly curing compositions to produce seals.

The compositions according to the invention may be employed for many applications such as sealing in the building industry, the assembly of the most diverse materials (metals, plastics, natural and synthetic rubbers, wood, cardboard, crockery, brick, ceramics, glass, stone, concrete, masonry components), the insulation of electrical conductors, the coating of electronic circuits, or the preparation of molds employed in the manufacture of objects from synthetic resins or foams.

Furthermore, they are more particularly suitable for the production of "in situ" seals employed in the automobile industry. These "in situ" seals encompass several types, namely, "crushed" seals, "formed" seals and "injected" seals.

The "crushed" seals are formed following the application of a pasty ribbon of the compositions to the zone of contact between 2 metal components to be assembled. The pasty ribbon is first deposited on one of the components and then the other component is immediately applied to the first; this results in a crushing of the ribbon before it is converted into elastomer. This type of seal is applicable to assemblies which usually do not need to be taken apart (oil sump seals, engine front end cover seals, etc.).

The "formed" seals are also obtained following the application of a pasty ribbon of the compositions to the zone of contact between 2 components to be assembled. However, after the deposition of the pasty ribbon on one of the components it is necessary to wait for the complete hardening of the ribbon to elastomer and the second component is applied to the first only after this time. As a result such an assembly can be easily taken apart since the component which is applied to that which has received the seal does not adhere to this seal. Furthermore, the seal, by virtue of its rubbery nature, adapts to all the irregularities of the surfaces to be sealed and, for this reason, there is no need (1) to machine the metal surfaces which are to be placed in contact with each other carefully and (2) to clamp the assemblies under pressure; these factors make it possible to eliminate, to some extent, fixing seals, spacers, or ribs which are usually intended to stiffen and strengthen the components of the assemblies.

Since the compositions according to the invention cure quickly at ambient temperature, in the presence or the absence of moisture, in an enclosed environment or in free air, it follows that the "formed" seals (and also the other "in situ" seals) resulting from the cure of these compositions can be produced under highly restrictive conditions. They may, for example, be produced on conventional assembly lines in the automobile industry which are equipped with an automatic apparatus for depositing the compositions. This automatic apparatus very frequently has a mixer head equipped with a deposition nozzle, the latter moving along the outline of the seals to be produced. The mixing head can receive the one-component polysiloxane composition and the accelerator, and can also have a third inlet allowing the introduction of a solvent for washing the equipment after use (cyclohexane, etc.).

The compositions produced and distributed by means of this apparatus must have a closely controlled cure time, on the one hand to avoid solidification in the mixer head and on the other hand to obtain a complete crosslinking after the application of the pasty ribbon to the parts to be sealed. These "formed" seals are more especially suitable for the seals of rocker arm covers, gearbox covers, timing chain covers and even oil sumps, etc.

The injected seals are formed in an enclosed environment, often in cavities which are completely closed; the compositions placed in these cavities are rapidly converted into elastomers whose properties are identical to those of elastomers resulting from hardening of the compositions in free air. These seals can ensure, for example, the sealing of crankshaft bearings.

The compositions according to the invention are also suitable for the production of quick-hardening seals in areas other than automotive. They can thus serve to glue and to seal electrical switch boxes made of plastic, and to produce seals for vacuum cleaners and for steam irons.

The elastomers formed by curing of the compositions according to the invention have mechanical properties which are similar to those of elastomers produced by exposure to atmospheric air of known one-component compositions, namely, the compositions formed by simple mixing of the constituents (A), (B) and (C) and if appropriate, of conventional additives without the addition of accelerators (D).

In order to further illustrate the present invention and the advantages thereof, the following specific examples are not by way of limitation of the invention. All parts are parts by weight.

EXPERIMENTAL

EXAMPLE I

A water curable composition was prepared by mixing the following components together in an apparatus which was flushed with a dry inert gas to insure the absence of atmospheric moisture:

| | Parts |
|---|---|
| Hydroxyl end-blocked polydimethyl siloxane fluid | 100.0 |
| Hydroxyl containing organosilicon fluid containing: | 15.0 |
| Trimethyl siloxy groups 2.3 wt. % | |
| dimethyl siloxy groups 75.2 wt. % | |
| monomethyl siloxy groups 22.5 wt. % | |
| Fumed silica - surface modified with octamethyltetrasiloxane | 21.0 |

-continued

| | Parts |
|---|---|
| Red iron oxide | 3.0 |
| Methyltriacetoxysilane | 5.35 |
| Di-t-butoxydiacetoxysilane | 1.34 |
| Dibutyltin dilaurate | 0.04 |
| | 145.73 |

The composition was kept sealed in an air tight container until used.

EXAMPLE II

This example illustrates the preparation of a typical organosilicon surface active agent useful in the present invention. The polysiloxane hydride starting material was prepared by acid equilibration. The polyalkylene oxide was prepared by allyl alcohol-initiated polymerization of ethylene oxide.

In a clean dry reaction kettle 25.2 parts of an allyloxy polyethylene glycol having a molecular weight of 550 was diluted with 100 parts of toluene and heated to remove any water present at the toluene azeotrope. The mixture was cooled to about 100° C. and then 1 part of 0.2 N sodium acetate in methanol/isopropanol and 0.04 part of a catalyst prepared according to U.S. Pat. No. 3,220,970 were added. 74.8 parts of an organosilicon hydride having the nominal formula $MD_{400}D'_{18}M$, (M=trimethylsiloxy, D=dimethylsiloxy, and D'=methylhydrogensiloxy) was added to the mixture over a period of about one hour. The reaction mixture was stirred for about three hours at 100° C., and the toluene was stripped out of the mixture. The mixture was then cooled and 900 parts of octamethylcyclotetrasiloxane was added.

EXAMPLE III

A cure accelerator of the invention was prepared by mixing 14 parts of the organosilicon surfactant solution of Example II, 200 parts of a trimethyl-siloxy end-stopped polydimethylsiloxane having a viscosity of 10,000 centipoise at 25° C. and 20 parts water. The mixture was homogenized using a Willems Polytron until a uniform water-in-oil emulsion was obtained.

EXAMPLE IV 100 g of the curable composition of Example I was loaded into a 6 oz. Semco tube containing a Semco propeller. Then 7 g. of the water-in-oil emulsion of Example III was placed in a Semco dasher rod in a manner that no air would be entrained when the emulsion was injected into the mass of curable composition. The dasher rod was screwed into the propeller and the propeller was moved to the center of the curable composition by manipulating the dasher rod. The emulsion then was injected into the mass and immediately mixed on a Semkit mixer for 90±10 seconds. The Semco tube was removed from the mixer and the following tests were run on the mixed final product

| Property, Dimensions | Value Observed |
|---|---|
| Flow (Sag), inches | 0.10 |
| Work Life (Snap Time), minutes | 15. |
| Tack Free Time (Touch Tack), minutes | 15. |
| Thick-Section Cure-(¼" deep), minutes | 30. |

An ASTM sheet and adhesion test specimens were fabricated from the above final mixture. The ASTM sheet and adhesion specimens were cured for the specified time at 23°±2° C. and 50±10% RH.

(1) PHYSICAL PROPERTIES

| Property, Dimension | Value Observed | |
|---|---|---|
| | @ 3 days cure | @ 15 days cure |
| Hardness, Shore A Scale | 17. | 22. |
| Avg. Ultimate Tensile Strength, psi | 200. | 251. |
| Avg. Ultimate Elongation, % | 620. | 617. |
| Tensile Product, psi × $10^{-3}$ | 124. | 155. |

(2) ADHESION PROPERTIES

| | @24 Hrs. | @ 7 Days |
|---|---|---|
| Lap Shear Strength, psi (Tinius Olson) | 93. | 135. |
| % Cohesive Failure | 100. | 100. |

Substrate: Soft clear plate glass
Adherend: Stainless steel screen given a 17 minutes/140° F. FPL etch, air dried, and single-dip primed. Primer was air dried approximately 30 minutes at Standard Conditions.

The hydrolytic stability of the resultant bond was evaluated by the following test procedure:
1. Tensile "H" specimens were fabricated using the final mixture in general accordance with a proposed method of ASTM Task Group C-24.35 (March 1986) for Structural Glazing Specification.
2. The specimens were cured for 7 and 21 days at 23°±2° C., 50±10% RH. The Teflon spacer blocks were removed after the specimens were cured 24 hours. It is noted that normally at least 14 days cure would be required before this were possible with the composition of Example I in the absence of the curing accelerator of the invention.
3. Test specimens were evaluated at the specified cure times. One set of specimens, cured 21 days, was then totally immersed in tap water for 7 days at laboratory ambient temperature (23° C.). At the end of the immersion period, the samples were removed from the water, blotted dry with a paper towel and then tested to destruction within one hour.

The following is a summary of the test results obtained:

| Tensile Adhesion Property, Dimensions | @ 7 days/ 23° C. Cure | | @ 21 days/ 23° C. Cure | | @ 21 days/ 23° C. Cure Plus 7 days H2O immersion | |
|---|---|---|---|---|---|---|
| Substrate Configuration (See below): | A | B | A | B | A | B |
| Ultimate Stress, psi | 170. | 70. | 175. | 150. | 147. | 155. |
| Avg. % Cohesive Fail | 40. | 0. | 100. | 100. | 100. | 67.* |

*2 specimens failed @ 100%, 1 specimen failed @ 1% Cohesive Failure.
Configuration A: soft clear plate glass (both surfaces)
Configuration B: anodized aluminum (one surface), soft clear plate glass (other surface).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:

1. An organopolysiloxane composition of matter, comprising (i) a polyhydroxylated polysiloxane, (ii) a polyacyloxysilane cross-linking agent therefor, and (iii) a hardening accelerator which comprises a water-in-oil emulsion of water in a polysiloxane stabilized with an organosilicon surface active agent.

2. The composition of claim 1, comprising (A) 100 parts of weight of essentially $\alpha,\omega$-bis(hydroxy)diorganopolysiloxane polymers having a viscosity of 500 to 10,000,000 centipoise at 25° C., and which polymers comprise recurring diorganosiloxy units of the formula $R_2SiO$, in which each individual R is chosen from the group consisting of monovalent hydrocarbon radicals or halo- or cyano-substituted hydrocarbon radicals having from 1 to 8 carbon atoms; (B) 2 to 20 parts by weight of a polyacyloxysilane cross-linking agent of the general formula $R_pSi(OCOR^2)_{4-p}$, in which R is as defined above, $R^2$ is a hydrocarbon radical free from aliphatic unsaturation and having from 1 to 15 carbon atoms, and p is zero or one; (C) 0 to 150 parts by weight of inorganic filler material; and (D) a hardening accelerator which comprises a water-in-oil emulsion of water in siloxane polymers selected from the group consisting of $\alpha,\omega$-bis(hydroxy) diorganopolysiloxanes, $\alpha$-(hydroxy)-$\omega$-(triorganosiloxy) diorganopolysiloxanes, $\alpha,\omega$-bis(triorganosiloxy) diorganopolysiloxane polymers and mixtures thereof having a viscosity of at least 500 centipoise at 25° C., and which polymers comprise recurring diorganosiloxy units of the formula $R_2SiO$ in which R is as above, stabilized with an organosilicon surface active agent, the amount of water present in said emulsion being such that the water comprises at least 0.01% by weight of (A)+(B).

3. The composition of claim 2 wherein said siloxane polymers are $\alpha,\omega$-bis(triorganosiloxy) diorganosiloxanes.

4. The composition of claim 2 wherein said organosilicon surface active agent comprises
(a) units of the formula $$R^4_2SiO_{2/2}$$

where $R^4$ is a substituted or unsubstituted hydrocarbon radical of from 1 to 12 carbon atoms;
(b) units of the formula:

$$R^4R^5SiO_{2/2}$$

where $R^5$ is a polyalkylene ether of the formula:

$$-R^7-(OR_6)_n-OR_8$$

where each $R^6$ individually is a substituted or unsubstituted alkylene group of 1 to 6 carbon atoms, $R^7$ is a substituted or unsubstituted alkylene group of 1 to 20 carbon atoms, $R^8$ is the same as $R^4$ or is hydrogen, n has a value of from about 5 to about 20; and (c) endstopping units of the formula $R^4SiO_{1/2}$;
with the proviso that the polysiloxane absent $R^5$ has a molecular weight of from about 10,000 to about 40,000, and the weight ratio of $R^5$ to polysiloxane absent $R^5$ is from greater than 15/85 to less than 35/65.

5. The organopolysiloxane composition of claim 2, wherein the components (A) and (B) comprise the devolatilized reaction product resulting from the stoichiometric reaction therebetween.

6. The composition of claim 2 wherein the polyacyloxysilane is methyl triacetoxysilane.

7. The composition of claim 2 comprising from 5 to 150 parts by weight of the inorganic filler material (C).

8. The composition of claim 2 further comprising a hardening catalyst, adjuvant, additive, or combination thereof.

9. The composition of claim 1 in elastomeric, hardened, cross-linked state.

10. The composition of claim 2 in elastomeric, hardened, cross-linked state.

11. A shaped article comprising the elastomeric organopolysiloxane as defined by claim 9.

12. A shaped article comprising the elastomeric organopolysiloxane as defined by claim 10.

13. A seal comprising the elastomeric organopolysiloxane as defined by claim 9.

14. A seal comprising the elastomeric organopolysiloxane as defined by claim 10.

* * * * *